United States Patent [19]

Miller

[11] 4,254,343

[45] Mar. 3, 1981

[54] DUAL LOAD CONTROL APPARATUS

[76] Inventor: J. Vance Miller, 2226 E. Amelia Ave., Phoenix, Ariz. 85016

[21] Appl. No.: 930,895

[22] Filed: Aug. 4, 1978

[51] Int. Cl.³ .......................... H02J 3/14; H02P 1/26
[52] U.S. Cl. ..................................... 307/41; 318/778
[58] Field of Search ...................... 318/772, 779, 778; 307/38, 41, 39, 112

[56] References Cited

U.S. PATENT DOCUMENTS

| | | | |
|---|---|---|---|
| 3,097,331 | 7/1963 | Miller | 318/772 |
| 3,366,861 | 1/1968 | Dudler | 318/778 |
| 3,426,259 | 2/1969 | Ziehm | 307/41 |
| 3,439,181 | 4/1969 | Goitiandia et al. | 307/38 |
| 3,858,094 | 12/1974 | Hanchett, Jr. | 307/38 X |
| 4,138,627 | 2/1979 | Camic | 307/39 X |

Primary Examiner—J. V. Truhe
Assistant Examiner—Richard M. Moose
Attorney, Agent, or Firm—H. Gordon Shields

[57] ABSTRACT

Apparatus for controlling parallel connected unequal electrical loads, such as the speeds of a two speed motor, from a two wire branch circuit having one leg load connected through a single pole, single throw switch, utilizing the unbalanced characteristics of the different loads, such as the high and low speed windings of a two speed split phase motor after the start winding circuit is broken, to control multiple solid state static switches coupled through a flip-flop for sequentially controlling the loads.

23 Claims, 2 Drawing Figures

Fig-2

DUAL LOAD CONTROL APPARATUS

BACKGROUND OF THE INVENTION

1. Field of the Invention

This invention relates to the control of the electrical loads, and, more particularly, to the control of two different electrical loads and selected auxiliary loads through sequential operation of a remotely placed single pole, single throw (SPST) switch.

2. Description of the Prior Art

Two United States Letters Patent have previously issued to the inventor hereof for control of two speed motors. The first is U.S. Pat. No. 3,097,331, dated July 9, 1963, and the second is U.S. Pat. No. 3,327,192, dated June 20, 1967.

The '331 patent describes a two speed split phase motor controlled by a remote SPST line switch through a single pole, double throw (SPDT) relay disposed externally of the motor. The '192 patent describes a two speed split phase motor, again controlled by a remote SPST line switch. In the '192 patent, the motor controlling relay is combined in the motor starting switch and is disposed in the switch end bell housing of the motor. The internal motor switching of the '331 and '192 patents, and of the motor discussed herein, includes the centrifugal switch system normally found in fractional horsepower split phase motors. That is, utilization is made of the rotational speed of the squirrel cage rotor in switching from the motor starting circuit to a sustained speed motor run circuit.

Included in both prior art patents are mechanical movements of the centrifugal switch associated with the switching from motor starting to a sustained motor running speed.

Also included in both prior art patents are relay and line switch contacts which carry the full current drawn by the operational motor during a period of contact bounce and seating on first closure of the contacts. The use of mechanisms and switch contacts impose certain limitations on reliability and longevity of the system in these types of apparatus. Inevitably, mechanical movements result in contact arcing and wear and other problems associated with repetitive mechanical switching. Hence, the employment of relay contacts carrying heavy currents results ultimately in the deterioration of mechanical functioning, and in the burning, pitting, and sticking of contacts. These factors tend to cause the entire apparatus to fail. For apparatus with solid state electronic switching, in which there are no moving parts, the inherent problems associated with mechanical movements and relay contacts are substantially eliminated.

Prior to the advent of the apparatus of the '331 patent, now commonly used in ducted evaporative cooler installations, the prior art consisted of running a third wire from a SPST line switch through a SPDT switch to a two speed motor. In a three wire branch circuit, one wire was serially connected to the common terminal, a second wire to the low speed terminal of the motor, and a third wire to the high speed terminal of the motor. In original installations the cost of running a third wire in the appliance branch circuit serving the two speed motor is quite modest. However, when a previously installed single speed motor is to be replaced by a two speed motor, installation of a third wire in the permanent appliance branch circuit is both time consuming and relatively expensive.

"Pulling" a third wire carries the additional requirements of (1) an electrical permit, (2) preliminary installation and inspection, (3) final installation and inspection, and additional switches, receptacles, appliance cords, and the like. Thus, both considerable time and expense are involved in the replacement of an installed single speed motor with a two speed motor. It is obvious that the apparatus of the present invention, and the apparatus of the '331 and '192 patents, offers an inexpensive and quickly installed alternative to providing a third wire in the appliance branch circuit.

In the present apparatus, the provision for single speed motor control by means of a single pole single throw line switch is extended for operational control of a two speed motor. This provides a simple, relatively inexpensive, and highly desirable alternative to installing a third wire in the appliance branch circuit in order to operate a remotely placed two speed motor.

The apparatus of the present invention includes features not found in either the '331 or the '192 patents. These features include a "soft start" of the motor in which the inrush current to the motor windings rises slowly during the starting procedure. Also included is start capability by means of an additional, remotely placed, signal circuit operating switch. A flip-flop turn-on circuit is used to give sequential operational control responsive to randomly timed signal circuit impulses. Fault/overload protective circuits are used to shut down the operating system on occurrence of a system fault or overload in the load operating circuits.

The apparatus of the present invention overcomes the undesirable aspects of the third-wire prior art, and diminishes or eliminates the threats to reliability and longetivy which may occur in the apparatus of the '331 and '192 patents.

SUMMARY OF THE INVENTION

The invention described and claimed herein comprises solid state static relay apparatus for controlling parallel connected unequal loads, employing a flip-flop for switching from a first operational mode to second operational mode. On the occurrence of a momentary break in the signal circuit connections, the apparatus switches to a second operational mode. In apparatus terms, controlling the load functions of a split phase two speed motor in the sequence of its several desired but transitory operating modes is accomplished while controlling additional auxiliary and/or remote load operating circuits of benefit to the overall operation of the installed system. Alternating current load operational switching is accomplished using appropriately gated triacs as switches for sequential and/or selected apparatus functions.

Among the objects of the present invention are the following:

To provide new and useful control apparatus;

To provide new and useful motor control apparatus;

To provide new and useful apparatus for controlling a two speed electric motor;

To provide new and useful apparatus to control two different electrical loads;

To provide new and useful solid state switching apparatus;

To provide new and useful switching apparatus for remotely controlling the speed of a two speed motor;

To provide new and useful apparatus for remotely controlling auxiliary functions associated with a motor operational mode;

To provide new and useful switching apparatus usable with fractional horsepower electric motors;

To provide new and useful control apparatus capable of controlling a variety of electrical loads;

To provide new and useful apparatus for controlling high inrush currents associated with randomly timed closure of line switch contacts;

To provide new and useful flip-flop turn-on circuit apparatus sequentially responsive to load operational circuit changes occurring at random time intervals; and To provide new and useful apparatus fault/overload protective circuits for multiple alternating current operational loads.

DESCRIPTION OF THE PREFERRED EMBODIMENT

Figure 1:
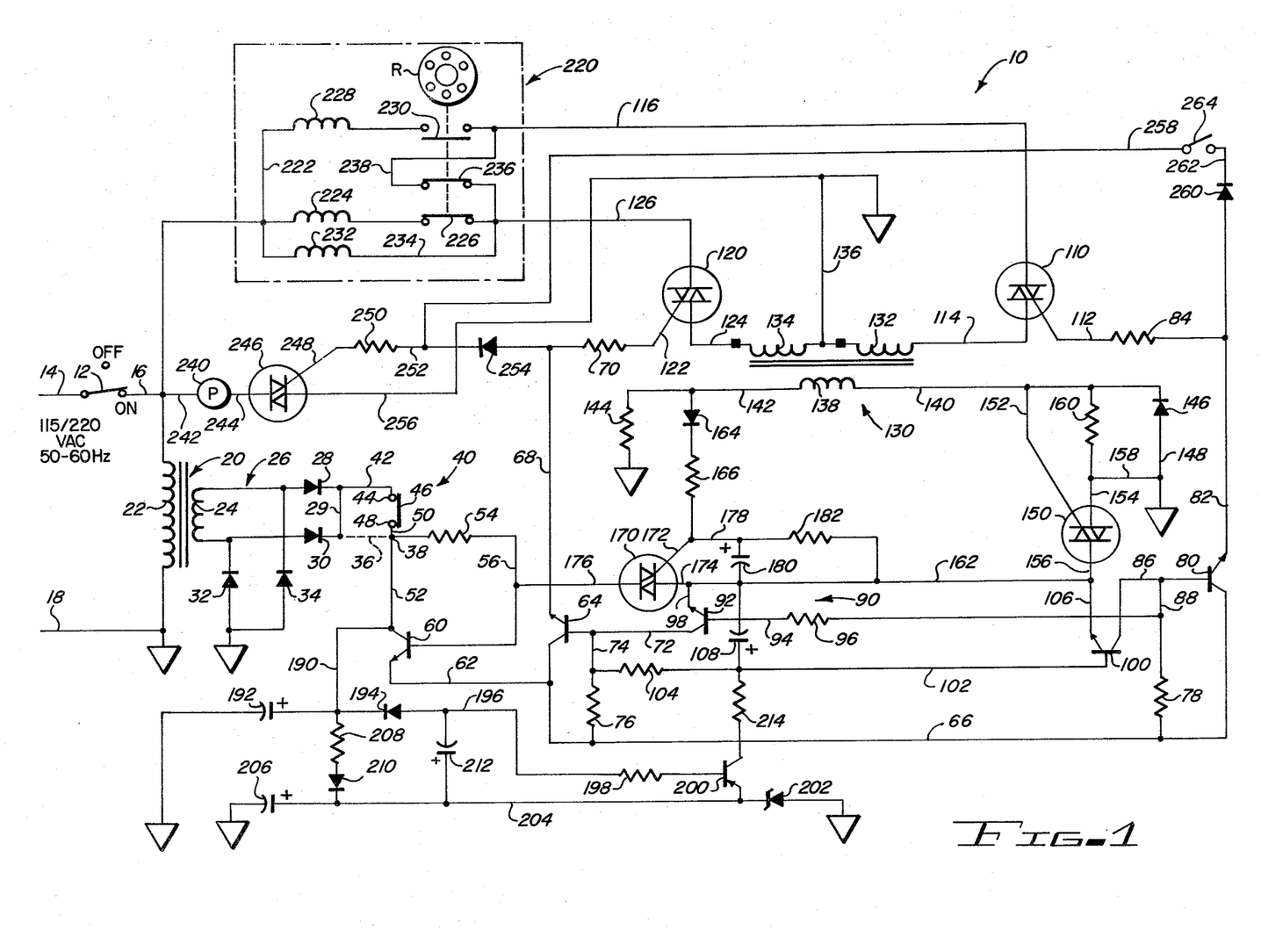
FIG. 1 is a schematic circuit diagram of the apparatus of the present invention.

FIG. 1 is a schematic circuit diagram of two speed motor control apparatus 10 of the present invention. It comprises a circuit diagram which includes a remotely placed single pole, single throw line switch 12 connected to line conductor 14, one of a pair of line conductors 14 and 18. The conductor 14 is the "hot" conductor, while line 18 is the return, ground, or common conductor for the apparatus. When the switch 12 is "on", it is connected to a switch leg conductor 16.

Also included in the circuitry of FIG. 1 are the three windings of a split-phase, two speed electric motor 220. In the embodiment of FIG. 1, the motor 220 is the operational load, with its low speed and high speed windings comprising dual loads for the control circuitry. The windings include a four pole start winding 224, a six pole main winding 228, and a four pole main winding 232. As is understood, the start winding is disposed ninety degrees (electrical) from the four pole main winding. One end of each of the three motor windings is connected to a conductor 222. The conductor 222 is connected to the switch leg conductor 16.

Operational control of motor 220 is accomplished by solid state switches, including pilot or load circuit triacs and signal circuit transistors. The circuitry utilizes line voltage alternating current for pilot circuitry and low voltage rectified direct current for signal circuitry. Current for the starting, low speed, and high speed windings of the motor is provided through a pair of pilot duty triacs, and the triacs are in turn switched on and off by transistors. As is known and understood, two-speed split phase motors include centrifugal switches used during start and low speed operation. They will be discussed below.

The low voltage signal circuitry may be controlled directly from the line switch 12, or remotely by a sensing switch, such as a thermostat 40. When sensing switch 40 is used, the line switch 12 must be in the "on" or closed position. Conversely, sensing switch 40, when used, must be closed when line switch 12 is responsive to desired operational control functions.

The line switch 12, in its "on" position as shown in FIG. 1, is connected to conductor 16. The conductor 16 is in turn connected to one end of primary winding 22 of transformer 20. The primary winding 22 is appropriately connected to the circuit common conductor 18. Conductor 18 is also connected to circuit common connectors or terminals denoted in FIGS. 1 and 2 by inverted triangles or inverted delta symbols.

The transformer 20 includes a secondary winding 24 which is connected into full wave bridge rectifier 26, which includes diodes 28, 30, 32, and 34. The diodes are connected in a well-known manner. The anodes of the diodes 32 and 34 are tied together to circuit common. The cathodes of diodes 28 and 30 are tied together by conductor 29, which is joined in turn to conductor 42 of the remote sensing switch 40, or to conductor 36 when switch 40 is not used.

When two-speed motor 220 is to be operated directly by line switch 12, and without remote sensing switch 40, then conductor 36 is used to connect the rectifier 26 with terminal 38. The conductor 36 is shown in phantom (dotted line) in FIG. 1. However, when two-speed motor 220 is to be operated by remote switch 40, then the switch 40 is connected between rectifier 26 and terminal 38.

The remote switch 40 includes a conductor 42 which extends from rectifier 26 to terminal 44. Another conductor 50 extends from terminal 48 to terminal 38. Between terminals 44 and 48 is conductive element 46. The conductive element 46 is connected to terminals 44 and 48 in response to a sensing switch change, such as a thermostatic switch being "made" on a temperature rise.

It is obvious that in order for remote switch 40 to be operative, line switch 12 must be and remain in the "on" position. Conversely, switch 40, when used, must be closed during any operation carried out through line switch 12, such as changing motor speed from low to high, as discussed below. It follows that the first momentary interruption of d-c signal circuit operating current by either 12 or switch 40 after low speed motor operation has been established will result in high speed motor operation. This procedure will be discussed in detail below.

"Momentary interruption" is here defined as a short period of time sufficient to move a switch to "off" and back to "on". If switch 12 or switch 40 is left in the "off" position for a time sufficient for motor 220 to re-establish the centrifugal switches for motor starting, then reactuation of switch 12 to the "on" position will simply result in motor 220 re-starting. Accordingly, the time limit for the switch 12 or the switch 40 to be in the "off" position before reclosing may vary from about one millisecond to something less than the several seconds required for the motor 220 to slow down and to actuate the centrifugal switches in the motor.

The signal voltage used in the control circuitry to control the pilot voltage, which is line voltage used by the motor 220, is low voltage transformed and rectified from line voltage. The line voltage from conductors 14 and 18 is transformed to a relatively low voltage by transformer 20, and the low voltage is rectified by the rectifier 26. The rectified low voltage for the signal portion of the apparatus 10 is appropriately coupled to terminal 38, either by conductor 36 or by switch 40.

From terminal 38, a conductor 52 extends to the collector of a transistor 60. The transistor 60 is the first of several solid state switches utilized in the apparatus of the present invention. The base of transistor 60 is connected to terminal 38 through a resistor 54 and a conductor 56. A conductor 62 extends from the emitter of transistor 60 to the collector of a transistor 64. A conductor 66 also is tied to the collector of transistor 64 and it extends to the collector of a transistor 80. A conductor 68 extends from the emitter of transistor 64 to the juncture of a resistor 70 and the anode of a diode 254. The resistor 70 extends between the conductor 68 and a conductor 122 which is connected to the gate terminal of a triac 120.

A conductor 72 extends from the base of transistor 64 to the collector of the transistor 92. The transistor 92 is one of the transistors comprising a bistable flip-flop 90. A conductor 74 extends between the conductor 72 and a resistor 76. The resistor 76 is in turn coupled to conductor 66. Another resistor 78 is also coupled to the conductor 66 and to a conductor 88. The conductor 88 is in turn connected to a conductor 86 which extends between the base of the transistor 80 and the collector of a transistor 100. The transistor 100 comprises the second transistor in the flip-flop 90.

A conductor 82 extends from the emitter of the transistor 80 to the juncture of a resistor 84 and the anode of a diode 260. The resistor 84 extends between the conductor 82 and a conductor 112 which is coupled to the gate of a second triac 110. Triacs 110 and 120 comprise pilot duty triacs which control the current flow to the motor 220.

The transistors 92 and 100 of the flip-flop 90 are connected together in a well-known manner. The base of transistor 92 is coupled to the collector of transistor 100 through a conductor 94, a resistor 96, and the conductors 88 and 86. The base of transistor 100 is coupled to the collector of transistor 92 by a conductor 102, a resistor 104, and the conductors 74 and 72. A conductor 98 extends from the emitter of transistor 92 to a conductor 162. A conductor 106 extends from the emitter of transistor 100 also to the conductor 162. A capacitor 108 extends between the conductors 102 and 162.

The pilot duty triacs 110 and 120 are coupled to a transformer 130. The transformer 130 includes a pair of oppositely wound (bifilar opposed) primary coils 132 and 134. One end of the primary winding 132 is connected to the MT1 terminal of triac 110 by a conductor 114. One end of the primary coil 134 is connected to the MT1 terminal of the triac 120 by a conductor 124. The other ends of both windings 132 and 134 are connected to a conductor 136 which is in turn connected to a circuit common.

The transformer 130 also includes a secondary winding 138. One end of the secondary winding 138 is connected to a conductor 140, and the other end of the secondary coil 138 is connected to a conductor 142. The conductor 142 extends to a circuit common through a resistor 144. The conductor 140 is connected to a circuit common through a diode 146 and a conductor 148. The conductor 140 is also connected to the gate of a triac 150 by a conductor 152. The conductor 140 is also coupled to the MT1 terminal of the triac 150 by a resistor 160 and a conductor 154. A conductor 158 extends between the conductor 154 and the conductor 148. The MT2 terminal of triac 150 is connected to conductor 162 by a conductor 156.

The triac 150 is a signal duty triac which is operatively coupled to the flip-flop 90. When the triac 150 turns on, as will be discussed in detail below, the flip-flop 90 is also turned on. The triac 150 provides a path to circuit common for the transistors 92 and 100 of the flip-flop 90. Accordingly, the triac 150 must be on in order for the flip-flop 90 to be on in both its set and its reset states.

A second signal duty triac 170 is also included in the apparatus of the present invention. It comprises a switch for turning off the apparatus of the present invention in case of a fault/overload condition. The gate connection of triac 170 is connected to the conductor 142 by a diode 164 and a resistor 166. The anode of the diode 164 is connected to the conductor 142, and the cathode of the diode 164 is connected to one end of the resistor 166. The other end of the resistor 166 is connected to a conductor 172 which is in turn connected to the gate terminal of the signal duty triac 170. The MT1 terminal of the triac 170 is connected to a conductor 174 which is in turn connected to the conductor 162. The MT2 terminal of the triac 170 is connected to conductor 56 by a conductor 176. A conductor 178 extends from the conductor 172 to the juncture of a capacitor 180 and a resistor 182. The capacitor 180 and the resistor 182 are both also connected to the conductor 162.

When the triac 170 is on, the transistor 60 is turned off when it is deprived of its base drive through resistor 54 and conductor 56 by the triac 170. This will be discussed in detail below.

The conductor 190, one end of which is connected to conductor 52 and to the collector of transistor 60, is in turn connected to a capacitor 192, the cathode of a diode 194, and a resistor 208. The capacitor 192 comprises a filter capacitor which extends between the conductor 190 and a circuit common. The anode of the diode 194 is connected to a conductor 196 and also to a capacitor 212. The conductor 196 is connected to a resistor 198 which is in turn connected to the base of a transistor 200. The collector of the transistor 200 is tied to the conductor 102 through a resistor 214. The emitter of the transistor 200 is connected to the cathode of a zener diode 202 and to a conductor 204. The anode of the zener diode 202 is connected to a circuit common. The other end of the conductor 204 is tied to a filter capacitor 206 which extends between the conductor 204 and a circuit common. The capacitor 212 is coupled between the conductors 196 and 204. The resistor 208 extends from the conductor 190 to the anode of a diode 210, and the cathode of the diode 210 is tied to the conductor 204 between the capacitors 206 and 212.

The primary purpose of the transistor 200 is to change the state of the flip-flop 90 to cause the flip-flop 90 to switch from its set state to its reset state. This will be discussed in detail below.

When the terminal 38 is connected to rectifier 26, the base of transistor 60 is provided current through resistor 54 and conductor 56. At the same time capacitor 192 is charging through conductors 52 and 190 to prevent transistor 60 from immediately turning on fully. When capacitor 192 charges to the voltage of the rectifier 26, transistor 60 comes on fully to allow full current to flow to motor 220 through the power triacs 110 and 120. Triacs 110 and 120 are turned on by transistors 80 and 64, respectively.

A "soft start" of motor 220 is accomplished when the switch 12 is initially turned "on" by using the filter capacitor 192 in the signal circuit. During motor starting the capacitor 192 charges to the voltage of rectifier 26 through conductors 52 and 190. Even though transistor 60 comes on before capacitor 192 is fully charged, triacs 110 and 120 begin to fire in the first quadrant of an alternating current sine wave, moving to first and third quadrants in step with the increasing charge on capacitor 192. The speed of the motor 220 builds or increases slowly to provide a "soft start". The relative length of time with respect to "slowly", in electronics terms, is on the order of a few cycles of alternating current. Thus, during the time that capacitor 192 requires for charging, the current flow through the triacs 110 and 120 to the motor 220 "slowly" increases to full current flow when capacitor 192 is fully charged.

The term "soft start" as used herein denotes a diminished inrush "spike" which occurs when a substantially simultaneous full current is applied to the motor windings on the closing of the switch 12. In other words, with a "soft start", the current flow increases from zero current flow to full current flow over a period of several milliseconds, relieving the damaging "spike" which arcs between switch contacts and which may sometimes pierce insulation.

When the switch 12 is opened momentarily and reclosed for a change of motor speed after motor start, there is current flow through triac 110, conductor 116, and switch 230 through the low speed winding 228 of motor 220. At the same time, there is a current flow of a different amplitude through triac 120 and through conductor 126 to conductor 234 and winding 232 of motor 220. The unequal current flow through the two power triacs is manifest by the different rate of current flow through primary windings 132 and 134 of transformer 130. The difference in current flow generates a voltage spike in the secondary winding 138 of the transformer 130. The current differential required between the transformer windings for flip-flop turn-on by signal circuit triac 150 is preset by resistor 160 and in the instant apparatus amounts to less than half an ampere.

Within the stator of the motor 220, as discussed above, are three windings, the start winding 224, the low speed winding 228, and the high speed winding 232. Also included in motor 220 is a centrifugally operated switch which includes three ganged sets of contacts connected by biasing spring action to the motor rotor R. For better understanding the operation of the present apparatus, the three sets of contacts will be referred to herein as three separate switches, but it is understood that the three switches are actuated centrifugally together. Switch 230, when closed, connects low speed winding 228 to conductor 116. Switch 226, when closed, connects start winding 224 to conductor 126. Conductor 126 is connected to conductor 234. Conductor 238 extends from conductor 116 to one terminal of switch 236. The other terminal of switch 236 is connected to conductor 234, conductor 126 and to the switch 226. When switch 236 is open, conductor 238 is disconnected from conductor 234. However, conductor 234 remains connected to conductor 126.

Conductor 234 extends from conductor 126 to the high speed winding 232 of the motor 220. As before stated, one end of each of the windings 224, 228, and 232 is connected to conductor 222 in the motor 220, and the conductor 222 is in turn connected to line conductor 16.

During the start procedure of motor 220, switches 226 and 236 are closed, and switch 230 is open. As the speed of the motor increases, centrifugal force affects the switches until, at an approximate predetermined speed, switches 226 and 236 open, and the switch 230 closes. With switch 230 closed, conductor 116 is connected to low speed winding 228. With switch 226 opened, start winding 224 is disconnected from a power source. With switch 236 opened, conductor 238 is disconnected from conductor 234 and from conductor 126.

During split-phase motor starting, when line switch 12 is initially moved from the off position to the on position, currents flow in primary winding 22 of transformer 20 and in secondary winding 24 of transformer 20. Secondary winding 24 is connected to the full wave bridge rectifier 26, which is in turn coupled to terminal 38. Transistor 60 is turned on "slowly", as discussed above, by a base drive through resistor 54 and conductor 56, and transistor 60 accordingly conducts.

With transistor 60 conducting, transistors 64 and 80 are turned on. With transistors 64 and 80 conducting, power triacs 110 and 120 are also turned on. Transistors 64 and 80 are switches controlling the triacs 120 and 110, respectively.

Current flow is then established through triacs 110 and 120 and through conductors 116 and 126 to motor 220. With triac 110 conducting, current flow is established through conductor 136, primary winding 132 of transformer 130, and through conductor 114 to triac 110, and from triac 110 and conductor 116 to motor 220. Conductor 116 is connected to conductor 238, switch 236, and through the closed switch 236 to conductor 234 and switch 226.

At the same time, another current path connects the conductor 136 to the triac 120 through the second primary winding 134 of transformer 130 and conductor 124. From triac 120, the current path continues through conductor 126 to conductor 234 in motor 220. In motor 220, the four pole start winding 224 and four pole main winding 232 are energized during the motor starting cycle. It is noted that equal and opposite currents flow through primary windings 132 and 134 of transformer 130 to cancel each other and there is no resultant signal voltage in the secondary winding 138 of transformer 130.

When centrifugal force opens switches 226 and 236, the four pole start winding 224 is disconnected and switch 230 closes to connect the six pole, low speed main winding 228 to conductor 116. The six pole main winding 228 is now connected to conductor 116, and four pole main winding 232 remains connected to conductors 234 and 126. A unequal load condition now exists through primary windings 132 and 134 of transformer 130 because the windings 228 and 232 do not comprise equal loads. The unequal load condition generates a voltage spike in the secondary winding 138. The secondary winding 138 is connected to the gate of triac 150 through conductor 140 and conductor 152. The triac 150 is turned on by the voltage spike. The triac 150 is connected to the flip-flop 90, which now drops triac 120 from parallel load connection with triac 110, and the motor 220 maintains low speed.

Either the up or down side of the voltage spike in the secondary winding 138 results in a current flow through conductor 140 and conductor 152 to the gate of triac 150, since the secondary winding 138 is here based on resistor 144. Once triac 150 is turned on, it is locked on by steady dc current flow from flip-flop 90, which turns on and latches the flip-flop.

The flip-flop 90 includes cross coupled transistors 100 and 92. The base of transistor 100 is connected to the collector of transistor 92 through conductor 102, resistor 104, and conductors 74 and 72. The base of transistor 92 is connected to the collector of transistor 100 through conductor 94, resistor 96, and conductors 88 and 86. The emitter of transistor 100 is connected to conductor 106, which extends to conductor 156. Conductor 156 is in turn connected to the MT2 terminal of triac 150.

The emitter of transistor 92 is connected to conductor 98, which extends to conductor 162. Conductor 162 is also connected to conductor 156 and the MT2 terminal of triac 150.

The conductor 162 extends from conductor 156 to conductor 174, which is connected to the MT1 terminal of triac 170. The MT2 terminal of triac 170 is connected to conductor 176 which extends to conductor 56. The gate terminal of triac 170 is connected to conductor 172. Conductor 172 is connected through resistor 166 to the cathode of diode 164. The anode of diode 164 is connected to conductor 142, which extends between one end of the secondary winding 138 of transformer 130 and forms a required circuit common connection through resistor 144. The opposite end of secondary winding 138 of transformer 130 is connected to conductor 140 and is based on diode 146. Conductor 152 extends from the gate terminal of triac 150 to conductor 140. Conductor 140 is connected to the cathode of diode 146, and the anode of diode 146 is connected to conductor 148. Conductor 148 is in turn connected to a circuit common. Conductor 158 extends from conductor 148 to conductor 154. The MT1 terminal of triac 150 is connected to circuit common through conductor 154, conductor 158, and conductor 148.

Capacitor 108 is connected between conductor 162 and conductor 102. The purpose of the capacitor 108, as discussed below, is to insure that the flop-flop 90 comes on in the set state, with transistor 92 on and transistor 100 off. The capacitor 108 prevents transistor 100 from turning on, insuring that transistor 92 comes on.

The flip-flop 90 is not operative during the starting operation of a two speed motor because there is no current path from the emitters of transistors 92 and 100 to a circuit common. The normal path for the current is through conductor 156 from conductors 98 and 162 or from conductor 106 and to triac 150, and from triac 150 through conductors 154 and 158 to conductor 148 and the circuit common connector. Since no current flows through triac 150, the flip-flop 90 remains off, and the transistors 64 and 80 are both on, as discussed above. With the transistor 80 turned on, there is a current flow from the emitter of transistor 80, through conductor 82, resistor 84, and conductor 112 to the gate of triac 110 to turn the triac 110 on. With transistor 64 turned on, there is a current flow from the emitter of transistor 64 through conductor 68, resistor 70, and conductor 122 to the gate of triac 120 to turn triac 120 on. Accordingly, in the motor starting mode the flip-flop 90 is off, and both triacs 110 and 120 are on, providing equal and balanced load conditions through primary windings 132 and 134 of transformer 130 to start winding 224 and the high speed winding 232 of motor 220.

When the voltage spike generated in the secondary winding 138 of the transformer 130 causes triac 150 to turn on, a path is provided from the emitters of transistors 100 and 92 by conductor 106 to conductor 156, and by conductor 98 and conductor 162 to conductor 156, respectively, and through triac 150 to conductors 154, 158, and 148 to circuit common. With current flow through triac 150, the flip-flop 90 goes to its set state, with transistor 92 on and transistor 100 off.

Capacitor 108 insures that the flip-flop 90 will turn on in a predetermined manner, which is defined as its set state, with transistor 92 on and transistor 100 off. Since conductor 102 is tied to the base of transistor 100, capacitor 108 momentarily prevents transistor 100 from turning on, thus insuring that transistor 92 does turn on. When transistor 92 is on, transistor 100 is off, and the flip-flop 90 is in its set state, as defined above. The function of capacitor 108 is to insure that the flip-flop 90 turns on in its set state by preventing transistor 100 from turning on when triac 150 turns on.

With transistor 92 on, the base of transistor 64 is pulled low, thus turning it off. With transistor 100 off, triac 120 is turned off since it lacks gate current from transistor 64 on conductors 68 and 122.

With transistor 100 off, transistor 80 remains on, providing current from the emitter of transistor 80 through conductor 82, resistor 84, and conductor 112 to the gate of triac 110. The motor 220 receives power through triac 110 from a circuit common terminal through conductor 136, winding 132 of transformer 130, conductor 114, and conductor 116. Conductor 116 is connected to one side of low speed winding 228 through switch 230. The other side of the low speed stator winding 228 is connected to conductor 222 which is connected to line conductor 16.

During motor start, both triacs 110 and 120 are on, and flip-flop 90 and triac 150 are off. When the motor is running at low speed, power triac 110 and signal circuit triac 150 are on, while power triac 120 is off. When the motor is running at high speed, signal circuit triac 150 is on, power triac 110 is off, and power triac 120 is on, to serve the high speed winding 232 of motor 220 through conductors 126 and 234.

Motor starting and operational speeds are achieved through three sequential conditions or states of the flip-flop 90. Starting is achieved when the flip-flop is off, allowing power triacs 110 and 120 to operate in balanced, parallel connection. Low speed is achieved and maintained by turning the flip-flop on to its set state on a load imbalance which occurs on a random timed realignment of motor switch contacts. This condition retains power on triac 110 and turns off power to triac 120. The low speed is sustained until a first occurrence of momentary interruption of the signal circuit by opening and closing switch 12, at which time the flip-flop 90 drops the power connection of triac 110 and establishes the power connection of triac 120 by changing to its reset state.

The momentary opening and then closing of the switch 12, once the motor is running in the low speed condition, causes the flip-flop 90 to switch from its set state or first mode to its reset state or second mode, with transistor 92 off and transistor 100 on. This in turn causes the power triac 120 to turn on and the power triac 110 to turn off. With transistor 100 on, the base of transistor 80 is pulled low to cause the transistor 80 to turn off, thus removing the gate current to triac 110.

When the transistor 100 turns on, the transistor 92 turns off. This provides base drive for transistor 64 from conductor 66, through resistor 76 and conductor 74, turning transistor 64 on. With transistor 64 on, gate current flowing to triac 120 through conductor 68, resistor 70, and conductor 122 causes triac 120 to turn on. The triac 150 remains on to provide a return path for flip-flop transistor 100 from its emitter, through conductor 106, conductor 156, and triac 150 to a circuit common terminal, as discussed above.

The change of states of the flip-flop 90 is accomplished by transistor 200. When switch 12 is initially closed during the start up procedure of motor 220, capacitor 192 charges first, as discussed above. Capacitor 206, larger than capacitor 192, takes longer to charge through resistor 208 and diode 210. Capacitor 212, which is connected to conductor 204, to the anode of diode 194 and to one side of resistor 198 through conductor 196, does not charge during initial start of the motor. The other side of resistor 198 is connected to the base of transistor 200 to provide base drive for turning on the transistor 200.

Switch 12 is momentarily turned off (opened) and then turned back on (closed) for changing the speed of the motor 220 from low to high by turning on transistor 200. When the power is turned off, capacitor 212 charges through diode 194 and it discharges through resistor 198 to provide the base drive for turning on transistor 200.

The diode 194 prevents capacitor 212 from being reverse charged from the rectifier 26, and capacitor 212 is prevented from accumulating a charge by zener diode 202. Thus capacitor 212 charges only when the power (switch 12) is turned off. The zener diode 202 also provides that emitter voltage of transistor 200 will be less than the voltage of the rectifier 26, keeping the transistor 200 off.

Capacitor 206 charges while power is on through resistor 208 and diode 210. The diode 210 routes the charging and discharging path for capacitor 206. When capacitor 206 discharges, it discharges through capacitor 212 and also through transistor 200.

When transistor 200 turns on, capacitor 108 charges and transistor 100 is turned on. The base drive to turn on transistor 100 is provided through transistor 200 and resistor 214 and conductor 102. With transistor 100 turned on, transistor 92 turns off. The flip-flop is accordingly in its reset state or second mode.

When transistor 100 turns on, the base of transistor 80 is pulled low to turn transistor 80 off. The reverse situation occurs with respect to transistors 92 and 64. When transistor 92 turns off, base drive is provided for transistor 64 through conductor 74 and transistor 64 turns on. With transistor 80 off, gate current to triac 110 is removed, causing power triac 110 to turn off. Transistor 64 provides gate voltage for turning on power triac 120 to provide current flow through triac 120, conductor 126, and to the high speed main winding 232 of motor 220 through conductor 234.

A fault/overload protective circuit is included in the apparatus of the present invention. The protective circuit includes signal circuit triac 170, diode 164, resistor 166, capacitor 180, and resistor 182. The resistor 166 is connected between gate conductor 172 of triac 170 and the cathode of diode 164. The anode of diode 164 connects to conductor 142. Resistor 182 and capacitor 180 are each connected by a lead to conductor 162, and their other leads are connected to gate conductor 172 of triac 170. Resistor 144 provides the gate circuit return for triacs 150 and 170 from the transformer secondary winding 138. The diode 146, also part of the fault/overload protection circuitry, provides a base for half wave charging of the capacitor 180. The capacitor 180 charges on alternate half waves, based on diode 146 through diode 164 and resistor 166.

During normal operation of the apparatus of the present invention, capacitor 180 charges after triac 150 turns on, but the charge is normally bled off through resistor 182. However, if the current flow through the power triac 110 or the power triac 120 to motor 220 increases beyond a predetermined level, capacitor 180 charges faster than the resistor 182 can bleed off the charge. Capacitor 180 will then discharge through the conductor 172 to the gate of triac 170 to turn the triac 170 on. When triac 170 turns on, current flows from rectifier 26 through resistor 54, conductor 56, conductor 176, and through triac 170 to conductor 162. This current flow results in the base of the transistor 60 going low and causes the transistor 60 to turn off. With transistor 60 turned off, transistors 64 and 80, or whichever one of them is on, turns off. The gate current for the power or pilot duty triacs 110 and 120 is accordingly removed to turn the triacs off, and the entire apparatus turns off. The motor 220 accordingly shuts off until the starting mode is again established by turning off line switch 12 for an interval to allow capacitor 192 to bleed down before reclosing line switch 12.

During normal start conditions, the overload/fault protective circuit is not functional. A thermal device within the motor and circuit breaker or fuse protection in the branch circuit is the normal protection until the motor is running in either high or low speed. After the initial start, when the motor 220 is running in either its low speed or its high speed condition, the overload protective circuit is functional. However, when an abnormal start condition or an abnormal run condition exists, as evidenced by an early and heavy current flow from transformer secondary winding 138, triac 150 immediately turns on and capacitor 180 charges to turn on the triac 170 to shut down the system.

An auxiliary load circuit, such as a recirculating pump 240, is shown in conjunction with motor 220. This operation is accomplished by connecting a power triac 246 in series with pump 240. Pump 240 is connected to line conductor 16 by conductor 242. Conductor 244 extends from the pump 240 to MT2 of triac 246. MT1 of triac 246 is connected by conductor 256 to conductor 136. Thus, the pump 240 is powered through triac 246.

The gate of triac 246 is shown connected to conductor 248 and to a resistor 250. A conductor 252 extends between the resistor 250 and the cathode of a diode 254. The anode of diode 254 is connected to the conductor 68, which is powered by the emitter of transistor 64. A conductor 258 extends from conductor 252 to a remote control signal circuit (thermostatic) switch 264, which is connected to a conductor 262 and to a diode 260 which is in turn connected to conductor 82. Conductor 82 is connected to the emitter of transistor 80.

Gate current is provided to triac 246 from conductor 68 when transistor 64 is on. The pump 240 will be on when motor 220 is operating at high speed through triac 120. When the motor is operating at low speed through triac 110, the pump 240 will be on only when the remote thermostatic switch 264 is closed to provide gate current to the triac 240 from conductor 82. It is implicit that cross-gating of the power triacs 120 and 110 is prevented by diodes 254 and 260 respectively.

Figure 2:
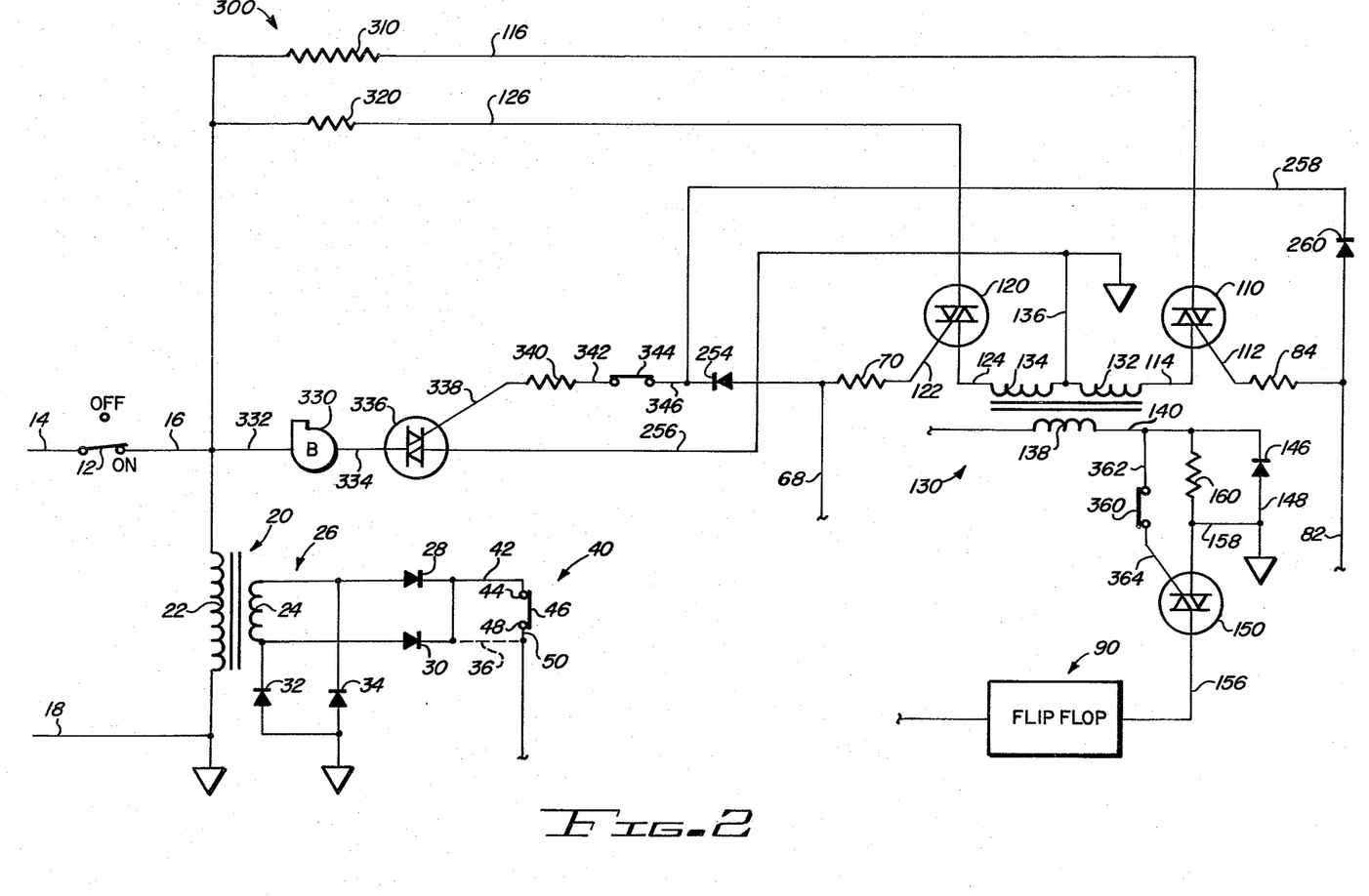
FIG. 2 is a schematic circuit diagram of an alternate embodiment of the apparatus of FIG. 1.

FIG. 2 is a schematic diagram, generally, of the apparatus of FIG. 1, in which the motor 220 of FIG. 1 has been replaced by heater apparatus 300, and the pump 240 of FIG. 1, with its associated circuitry, has been replaced by a blower 330 and its associated circuitry. The basic circuitry of FIG. 1, including the pilot triacs 110 and 120, with their associated circuitry, the flip-flop 90 and its associated circuitry, the line switch 12, the transformer 20, and the rectifier 26, are all substantially identical in function in both FIGS. 1 and 2 and accordingly the same reference numerals are used in FIG. 2 as in FIG. 1 for the same elements. The new reference numerals in FIG. 2 pertain only to the changed circuitry of FIG. 2, and are in the 300 series.

The pair of line conductors 14 and 18 are connected to the transformer 20 and rectifier 26 substantially as shown in FIG. 1. The line switch 12 extends between the line conductor 14 and the conductor 16. The conductor 16 extends from switch 12 to the heater 300. The heater 300 includes a pair of heating elements 310 and 320. The conductor 16 is connected to the transformer 20, as in the embodiment of FIG. 1. A resistive heater element 310 and a resistive heater element 320 are connected in parallel with conductor 16. The resistive element 310 is in turn connected to the conductor 116, which extends to the triac 110. The resistive element 320 is connected to the conductor 126, which extends to the triac 120. The heater element 310 is preferably of a higher wattage than the resistive element 320. This is schematically represented in FIG. 2.

A conductor 332 extends from line conductor 16 to one lead of the blower 330. The other lead of the blower 330 is connected to a conductor 334 which extends to the MT2 terminal of triac 336. The MT1 terminal of triac 336 is connected to the conductor 256, which extends to the conductor 136 of the transformer 130. A conductor 338 extends from the gate terminal of triac 336 to a resistor 340, which is in turn connected to a conductor 342. A thermostatic switch 344 extends between the conductor 342 and a conductor 346. The conductor 346 is connected to the cathode of diode 254.

The conductor 258 is also connected to the conductor 346. The conductor 258 extends between the conductor 346 and the cathode of the diode 260. The diodes 260 and 254 are connected, respectively, to the gates of triacs 110 and 120. Accordingly, when there is a current flow to the gates of triacs 110 and 120 to turn the triacs 110 and 120 on, there is also a current flow through the diodes 260 and 254 to the conductor 346. When the thermostatic switch 344 is closed, there is current flow from conductor 346 through the switch 344, and through conductor 342, resistor 340, and conductor 338 to the gate of the triac 336 to turn the triac 336 on. With the triac 336 on, there is current flow from conductor 136 through conductor 256, triac 336, and conductor 334 to the blower 330.

The thermostatic switch 344 closes or makes on a temperature rise to turn on the blower 330. If a mandatory "on" condition of the blower 330 is desired, as for example when the higher wattage heating element 310 is on, and yet it is desired to maintain an optional "on" condition of the blower when heating element 320 is on, the thermostatic switch 344 need only be moved relative to conductor 258. That is, by connecting the switch 344 directly to the cathode of diode 254, and connecting conductor 258 to conductor 342, the triac 336 will turn on when triac 110 is on, thus turning on the blower 330 when heating element 310 is on. When heating element 310 is off, and heating element 320 is on, the blower 330 will be on when the thermostatic switch 344 is closed.

If the thermostatic switch 40 is used to turn on the system, the switch 40 is preferably the reverse of thermostatic switch 344, so that the switch 40 closes on a temperature drop to turn on the system, which turns on the heating elements 310 and 320.

When the system initially is turned on by the thermostatic switch 40, assuming that line switch 12 is closed, both triacs 110 and 120 are turned on, as explained above in conjunction with the apparatus of FIG. 1. This allows a current flow to the heater 300 on both conductors 116 and 126. The conductor 116 is connected to the heating element 310, while the conductor 126 is connected to the heating element 320. As illustrated in FIG. 2, the heating element 310 is of a higher wattage rating than the heating element 320, and heating element 310 accordingly produces more heat than does the heating element 320.

With both triacs 110 and 120 on, heat is produced more rapidly, initially, than with only one of the heating elements on. When the temperature reaches a predetermined minimum, the thermostatic switch 344 closes to turn on the blower 330. From the circuit apparatus illustrated in FIG. 2, the triac 336 may be turned on when either triac 110 or triac 120, or both triacs 110 and 120, are turned on. Thus, providing the thermostatic switch 344 is closed, the blower 330 will be turned on through the pilot triac 336 when a predetermined temperature is sensed by the thermostatic switch 344.

The turning on of the flip-flop 90 in the embodiment of FIG. 2 is somewhat different from that shown in the embodiment of FIG. 1. The flip-flop 90 in FIG. 1 turns on automatically when the centrifugal switch in the motor 220 is actuated, but there is no counterpart to the centrifugal switch, in the embodiment of FIG. 2, associated with the heating elements 310 and 320. Rather, in the embodiment of FIG. 2, a thermostatic switch 360 is connected to the gate of the signal triac 150. The thermostatic switch 360 is connected to a pair of conductors 362 and 364. The conductor 362 is connected to conductor 140, which extends from the secondary winding of the transformer 130. The conductor 364 extends from the switch 360 to the gate of the triac 150.

The thermostatic switch 360 makes or closes on a temperature rise to turn off the heater element 320 by turning on the flip-flop 90. When the temperature reaches a predetermined minimum, the thermostatic switch 360 closes to turn on the triac 150. When the triac 150 turns on, the flip-flop 90 turns on to its set state, as explained in conjunction with the embodiment of FIG. 1. And, when the flip-flop 90 turns on, the pilot triac 110 remains on while the pilot triac 120 turns off. With the pilot triac 110 on, a current flow continues through the triac 110 to the heating element 310 through conductor 116 to allow the heating element 310 to remain on. However, the triac 120 is turned off, thus stopping the current flow through triac 120 to heating element 320 by way of conductor 126. The heating element 320 accordingly drops out or shuts off.

Since the heating elements 310 and 320 draw different amounts of current, there is an unbalanced load condition existing in the primary windings of the transformer 130 when both elements are on. The unbalanced load results in the generation of a voltage in the secondary winding 138 of the transformer 130 which, when the thermostatic switch 360 is closed, causes the triac 150 to turn on. In turn, the flip-flop 90 turns on, causing the triac 120 to turn off and the heating element 320 to drop out. The triac 110 and heating element 310 remain on.

When it is desired to turn off heating element 310 and to turn on the heating element 320, the line switch 12 must be momentarily opened and then closed, as discussed above in conjunction with the changing of the speed of the motor 220 in the embodiment of FIG. 1. The momentary opening and then closing of line switch 12 causes the flip-flop 90 to change from its set state to its reset state. As a result, transistor 100 turns on and transistor 92 turns off. This, in turn, causes the triac 110 to turn off, dropping out the heating element 310, and causes the triac 120 to turn on, allowing the heating element 320 to turn on.

The embodiment of FIG. 2, in the main, is substantially identical to the apparatus of FIG. 1 in operation. The particular load or loads in the two embodiments are different, but the functioning of the circuitry associated with the loads is substantially identical in the two embodiments.

If thermostatic switch 40 is used for motor or heater control, when switch 12 is closed, as for example in the embodiment of either FIG. 1 or FIG. 2, a thermostatic system On/Off may be used which is comparable to manual sequential manipulation of line switch 12. This includes the parallel or dual load operation of the apparatus when the flip-flop 90 is off. It may also provide for a randomly timed turning on of the flip-flop 90 to its set or first operational mode. Further, a SPST sub-base switch usually found on thermostats, when momentarily turned off then immediately turned back on, will change the flip-flop to its reset or second operational mode in exactly the same sequential manner as described for line switch 12.

The significant fact will be noted that sequential apparatus control is achieved with the apparatus of the present invention without the usual "black boxes", such as relays, transformers, wire bundles and the like, so often provided as essential to remote low voltage switching devices used for heating/cooling/ventilating installations.

While like loads have been illustrated in FIGS. 1 and 2, the control apparatus need not be restricted to like loads. For example, the control apparatus need not be used only with motor loads or heater loads, but may be used for controlling any unequal parallel electrical loads which may be sequentially activated. For unlike loads, a thermostat or other type switch may be used to prevent one of the power triacs 110 or 120 from initially coming on when power is applied. For example, an evaporative cooler and a refrigeration system may be used as the parallel and unequal loads, with a humidistat to control the gate circuitry of the triac 120. When the system is initially turned on, with low humidity, only the evaporative cooler controlled by triac 110 will come on. As humidity increases, the humidistat closes the gate circuit for triac 120, so that momentary interruption of line switch 12 will cause the refrigeration system to turn on and the evaporative cooling system to turn off.

What is claimed is:

1. Electrical control means for controlling unequal electrical loads connected to a source of current, comprising, in combination:
a pair of line conductors, including a first line conductor and a second line conductor for providing a source of electrical current;
load means connected to the first line conductor, including
a first electrical load, and
a second electrical load different from the first electrical load;
pilot switch means for controlling the current flow to the load means, including
a first pilot switch connected to the second conductor of the pair of line conductors and to the first electrical load for providing a flow of current to the first electrical load when turned on, and
a second pilot switch connected to the second conductor of the pair of line conductors and to the second electrical load for providing a flow of current to the second electrical load when turned on;
signal switch means for controlling the pilot switch means, including
a first signal switch connected to the first pilot switch for turning the first pilot switch on and off, and
a second signal switch connected to the second pilot switch for turning the second pilot switch on and off; and
a single pole, single throw switch connected to the first line conductor and to the signal switch means and actuable to turn the first signal switch off and to turn the second signal switch on to turn off the first pilot switch to stop the current flow to the first electrical load and to turn on the second pilot switch to provide current flow to the second electrical load.

2. The apparatus of claim 1 in which the signal switch means includes a flip-flop having a set state and a reset state connected to the first and second signal switches for controlling the first and second signal switches, with the set state of the flip-flop connected to the first and second signal switches for turning the first signal switch on and the second signal switch off and to turn the first pilot switch on and connect the first electrical load to a source of current, and with the reset state of the flip-flop connected to the first and second signal switches for turning the first signal switch off to turn off the first pilot switch to disconnect the first electrical load from the source of current, and for turning the second signal switch on to turn on the second pilot switch to connect the second electrical load to the source of current.

3. The apparatus of claim 2 in which the signal switch means further includes a third signal switch for turning on the flip-flop in response to the flow of current to the load means.

4. The apparatus of claim 3 in which the signal switch means further includes means for turning the flip-flop on in its set state when the third signal switch means is turned on.

5. The apparatus of claim 4 in which the pilot switch means includes a transformer connected to the source of current and having
a first primary winding connected to the first pilot switch means;
a second primary winding connected to the second pilot switch means and wound oppositely from the first primary winding; and
a secondary winding connected to the third signal switch for generating a voltage to turn on the third signal switch in response to an unequal flow of current in the first and second primary windings.

6. The apparatus of claim 5 in which the signal switch means further includes a fourth signal switch for changing the state of the flip-flop from the set state to the reset state to turn off the first signal switch and the first pilot switch, and to turn on the second signal switch and the second pilot switch to disconnect the first electrical load from the source of current and to connect the second electrical load to the source of current in response to the momentary opening and then closing of the single pole, single throw line switch.

7. The apparatus of claim 6 in which the signal switch means further includes a fifth signal switch connected to the first and second signal switches for turning the first and second signal switches on and off.

8. The apparatus of claim 7 in which the signal means further includes a sixth signal switch connected to the transformer and to the fifth signal switch for turning the first and second signal switches off in response to a predetermined current flow to the first or to the second electrical loads.

9. The apparatus of claim 1 in which
the load means includes a third electrical load; and
the pilot switch means further includes a third pilot switch connected to the third electrical load and to the second conductor of the pair of conductors for providing a current source to the third electrical load, and connected to the signal switch means for turning on and off the third pilot switch.

10. In combination with a split phase electric motor having a start winding, a low speed winding, and a high speed winding, a common conductor connected to one end of each of the windings, and a centrifugal switch having a first pair of normally open contacts, one of which contacts is connected to the other end of the low speed winding, a second pair of normally closed contacts, one of which contacts is connected to the other end of the start winding and the other of which contacts is connected to the other end of the high speed winding, and a third pair of normally closed contacts, one of which contacts is connected to the other contact of the first pair of contacts and the other of which contacts is connected to the other end of the high speed winding and to the other contact of the second pair of contacts, apparatus for operating the motor by providing a source of current to the respective windings of the motor from the other line conductor, comprising, in combination:
a pair of line conductors, including
a first line conductor connected to the common conductor of the electrical motor, and
a second line conductor;
a single pole, single throw line switch connected to the first line conductor having an open and a closed position;
pilot switch means connected to the second line conductor, including
a first pilot switch connected to the other contact of the first pair of normally open contacts for providing current to the other contact of the first pair of contacts and to the one contact of the third pair of contacts, and
a second pilot switch connected to the other end of the high speed winding and to the other contacts of the second and third pairs of contacts;
signal switch means connected to the pilot switch means, including
a first signal switch for turning on and off the first pilot switch,
a second signal switch for turning on and off the second pilot switch,
a third signal switch for turning on the first and second signal switches when the line switch is closed to turn on the first and second pilot switches to provide current for the start winding and the high speed winding for starting the motor, and
flip-flop means for turning on and off the first and second signal switches after the motor has started and in response to the opening and closing of the single pole, single throw line switch.

11. The apparatus of claim 10 in which the pilot switch means further includes a transformer having a pair of oppositely wound primary windings and a secondary winding, and the first pilot switch is connected to the first winding of the pair of primary windings and the second pilot switch is connected to the second winding of the pair of primary windings, and a voltage is generated in the secondary winding after the centrifugal switch is actuated after starting the motor to close the normally open pair of contacts and to open the normally closed pairs of contacts to disconnect the start winding and to connect the low speed winding.

12. The apparatus of claim 11 in which the flip-flop means of the signal switch means includes a flip-flop having a set state and a reset state, a fourth signal switch for turning on the flip-flop in response to the voltage generated in the secondary winding of the transformer, and set means for causing the flip-flop to turn on its set state.

13. The apparatus of claim 12 in which the flip-flop is connected to the first and second signal switches for turning the signal switches on and off in response to the state of the flip-flop, with the set state of the flip-flop connected to the second signal switch to turn the second signal switch off and to allow the first signal switch to remain on, and with the reset state of the flip-flop connected to the first signal switch to turn the first signal switch off and to turn the second signal switch on.

14. The apparatus of claim 13 in which the signal switch means further includes a fifth signal switch connected to the flip-flop for changing the state of the flip-flop from its set state to its reset state in response to the momentary opening and closing of the single pole, single throw line switch to cause the first signal switch to turn off and accordingly for the first pilot switch to turn off to disconnect the low speed winding from the current source, and to cause the second signal switch to turn on and the second pilot switch to turn on to provide current to the high speed winding of the motor to cause the motor to change from low speed to high speed.

15. The apparatus of claim 14 in which the signal switch means further includes a sixth signal switch connected to the third signal switch for turning off the third signal switch in response to a predetermined minimum current flow through the first pilot switch or the second pilot switch.

16. The apparatus of claim 15 in which the signal switch means further includes a first remote switch for turning on the third signal switch in response to the occurrence of a first predetermined event.

17. The apparatus of claim 10 in which the pilot switch means further includes
an auxiliary load, and
a third pilot switch connected to the load for providing current to the auxiliary load and connected to the first signal switch means and to the second signal switch means for turning on the third pilot switch means when either the first or the second signal switches are on.

18. The apparatus of claim 17 in which the pilot switch means further includes a second remote switch connected to the third pilot switch and to the first signal switch for turning the third pilot switch on when the first signal switch is on in response to the happening of a second predetermined event.

19. The apparatus of claim 10 in which the signal circuit means further includes soft start means for turning on the third signal means over a period of time to allow the first and second signal switches to turn on over the same period of time and therefore to connect the motor to the source of current over the period of time.

20. Switching apparatus for providing a signal from two unequal electrical loads, comprising, in combination:
- a transformer, including
  - a first primary winding,
  - a second primary winding wound oppositely from the first primary winding, and
  - a secondary winding;
- a first electrical load connected to the first primary winding;
- a second electrical load different from the first electrical load connected to the second primary winding;
- first switch means connected to the first electrical load and to the first primary winding to control the flow of current to the first electrical load;
- second switch means connected to the second electrical load and to the second primary winding to control the flow of current to the second electrical load;
- third switch means for turning on the first and second switch means to provide current flows through the first and second primary windings and to the first and second electrical loads; and
- fourth switch means connected to the secondary winding of the transformer and to the first and second switch means for controlling the first and second switch means in response to a pulse generated in the secondary winding of the transformer by unequal current flow in the first and second primary windings when the third switch means is actuated to provide current flows to the first and second electrical loads.

21. The apparatus of claim 20 in which the first switch means comprises a first triac connected to the first electrical load, to the first primary winding, and to the third and fourth switch means; and the second switch means comprises a second triac connected to the second electrical load, to the second primary winding, and to the third and fourth switch means.

22. The apparatus of claim 20 in which the fourth switch means includes a flip-flop connected to the secondary winding and having a first stable state connected to the first switch means and a second stable state connected to the second switch means.

23. The apparatus of claim 22 in which the fourth switch means further includes means for changing the flip-flop from its first stable state to its second stable state to turn off the first switch means and to turn on the second switch means.

* * * * *